(12) United States Patent
Grant

(10) Patent No.: US 8,143,865 B2
(45) Date of Patent: Mar. 27, 2012

(54) AVERAGE CURRENT MODE CONTROLLED CONVERTER HAVING A BUCK MODE, A BOOST MODE, AND A PARTIAL FOUR-SWITCH MODE

(75) Inventor: Matthew A. Grant, Palo Alto, CA (US)

(73) Assignee: Active-Semi, Inc., British Virgin Islands (VG) (VG)

( * ) Notice: Subject to any disclaimer, the term of this patent is extended or adjusted under 35 U.S.C. 154(b) by 589 days.

(21) Appl. No.: 12/229,538

(22) Filed: Aug. 22, 2008

(65) Prior Publication Data
US 2010/0045254 A1    Feb. 25, 2010

(51) Int. Cl.
*G05F 1/59* (2006.01)

(52) U.S. Cl. ........ 323/222; 323/271; 323/284; 323/285; 323/299

(58) Field of Classification Search ................... 323/222, 323/271, 284, 285, 287, 299
See application file for complete search history.

(56) References Cited

U.S. PATENT DOCUMENTS

| | | | |
|---|---|---|---|
| 4,958,121 A * | 9/1990 | Cuomo et al. ................ | 323/224 |
| 4,967,138 A * | 10/1990 | Obergfell et al. ............. | 323/224 |
| 6,215,286 B1 * | 4/2001 | Scoones et al. ............... | 323/222 |
| 6,275,016 B1 * | 8/2001 | Ivanov .......................... | 323/224 |
| 6,765,371 B2 * | 7/2004 | Kataoka ........................ | 323/222 |
| 6,977,488 B1 * | 12/2005 | Nogawa et al. ............... | 323/271 |
| 7,199,563 B2 * | 4/2007 | Ikezawa ........................ | 323/266 |
| 7,221,130 B2 * | 5/2007 | Ribeiro et al. ................ | 323/271 |
| 7,242,168 B2 * | 7/2007 | Muller et al. ................. | 323/222 |
| 7,248,030 B2 * | 7/2007 | Yoshino ........................ | 323/284 |
| 7,292,016 B2 * | 11/2007 | Wake ............................. | 323/271 |
| 7,733,072 B2 * | 6/2010 | Kanakubo ..................... | 323/271 |
| 7,804,282 B2 * | 9/2010 | Bertele ......................... | 323/222 |
| 2005/0007089 A1 | 1/2005 | Niiyama et al. .............. | 323/282 |

(Continued)

FOREIGN PATENT DOCUMENTS
CN    1578083 A    2/2005

OTHER PUBLICATIONS

Salerno, "Versatile buck-boost converter offers high efficiency in a wide variety of applications", May 2005, Linear Technology Magazine, pp. 8-10 and 24.*

(Continued)

*Primary Examiner* — Jeffrey Sterrett
(74) *Attorney, Agent, or Firm* — Imperium Patent Works; T. Lester Wallace; Darien K. Wallace

(57) ABSTRACT

An average current-mode controlled converter has a buck mode, a boost mode, and a four-switch mode. In one example, the converter operates in one of the three modes, depending on the difference between the converter output voltage VOUT and the converter input voltage VIN. Whether the four-switch mode is a full-time four-switch mode or a partial four-switch mode is user programmable. The novel converter can also be programmed to operate in other ways. For example, the converter can be programmed so that there is no intervening four-switch mode, but rather the converter operates either in a buck or a boost mode depending on VOUT-VIN. The converter can also be programmed so that the converter always operates in a conventional full-time four-switch mode. In one embodiment, the converter is programmed by setting an offset between two internally generated ramp signals and by setting associated limiting and inverting circuits.

20 Claims, 12 Drawing Sheets

AVERAGE CURRENT MODE CONVERTER HAVING PURE BUCK MODE, PARTIAL FOUR-SWITCH BUCK-BOOST MODE, AND PURE BOOST MODE

U.S. PATENT DOCUMENTS

| | | | |
|---|---|---|---|
| 2006/0284606 A1* | 12/2006 | Chen et al. | 323/259 |
| 2008/0001587 A1* | 1/2008 | Cremoux | 323/282 |
| 2009/0108820 A1* | 4/2009 | Mirea | 323/271 |
| 2009/0262556 A1* | 10/2009 | Tomiyoshi et al. | 363/17 |
| 2010/0019745 A1* | 1/2010 | Keskar et al. | 323/271 |
| 2010/0045254 A1* | 2/2010 | Grant | 323/283 |
| 2010/0231189 A1* | 9/2010 | Chen et al. | 323/284 |

OTHER PUBLICATIONS

Texas Instruments, brochure, "High Efficient Single Inductor Buck-Boost Converter With 2-A Switches", pub. Jun. 2008, downloaded from Internet Aug. 4, 2008, http://focus.ti.com/docs/prod/folders/print/tps63010.html.

Analog Devices, brochure, "600 mA/1000 mA, 2.5 MHz Buck-Boost DC-to-DC Converter, ADP2503/2504", downloaded from Internet Aug. 12, 2008, http://www.analog.com/static/imported-files/data_sheets/ADP2503_2504.pdf.

Rako, Paul: "Buck-boost Converters Change With the Times", EDN Magazine, pub. May 1, 2008, downloaded from Internet Aug. 12, 2008, http://www.edn.com/index.asp?layout=article&articleid=CA6553622.

LTC3440—Micropower Synchronous Buck-Boost DC/DC Converter, downloaded from Internet Aug. 5, 2008, http://www.linear.com/pc/productDetail.jsp?navId=H0,C1,C1003,C1042,C1116,P2123.

SIPO—The first examination opinion for patent application 200910161783.0 dated Sep. 13, 2011 (6 pages).

* cited by examiner

AVERAGE CURRENT MODE CONVERTER HAVING
PURE BUCK MODE, PARTIAL FOUR-SWITCH BUCK-BOOST
MODE, AND PURE BOOST MODE

PURE BUCK MODE

PURE BUCK MODE

PURE BUCK MODE

FULL-TIME FOUR-SWITCH MODE

FULL-TIME FOUR-SWITCH MODE

FULL-TIME FOUR-SWITCH MODE

PURE BOOST MODE

PURE BOOST MODE

PURE BOOST MODE

PURE BOOST MODE

PARTIAL FOUR-SWITCH BUCK-BOOST MODE

PURE BUCK MODE

AVERAGE CURRENT MODE CONTROLLED CONVERTER HAVING A BUCK MODE, A BOOST MODE, AND A PARTIAL FOUR-SWITCH MODE

TECHNICAL FIELD

The present disclosure relates generally to converters that are operable in a buck mode, a four-switch mode, and a boost mode, depending on a difference between an output voltage VOUT and an input voltage VIN.

BACKGROUND

A DC-to-DC switched mode power supply may employ a circuit involving an inductor and four switches. A first of the switches (S1) is coupled between a source of a rough DC voltage VIN and a first terminal of the inductor. A second of the switches (S2) is coupled between the first terminal of the inductor and a ground node. A third of the switches (S3) is coupled between a second terminal of the inductor and the ground node. A fourth of the switches (S4) is coupled between the second terminal of the inductor and a load. If the switches are made to switch in a first fashion, then the power supply operates as a "buck converter" in that it converts a higher input voltage VIN into a smaller DC output voltage VOUT that is supplied to the load. If the switches are made to switch in a second fashion, then the power supply operates as a "boost converter" in that it converts a lower input voltage VIN into a larger DC output voltage VOUT on the load.

In some applications, it is useful to switch the switches of the circuit such that the circuit operates as a buck converter at some times and operates as a boost converter at other times. Consider, for example, an application in which a battery is used to supply a circuit with a fixed DC supply voltage. When the battery is fully charged, the DC voltage from the battery is larger than the DC voltage required by the circuit. The intervening power supply therefore operates as a buck converter, receives the higher input battery voltage, and outputs the lower DC voltage required by the circuit. As the battery discharges, however, the DC voltage output by the battery decreases. At a certain point, the DC voltage output by the battery is lower than the DC voltage required by the circuit. The intervening power supply then is made to operate as a boost converter. The boost converter receives the lower DC voltage from the battery and outputs the higher required DC voltage to the circuit. The intervening power supply may be referred to as a "buck-boost" converter. There are many known topologies for buck-boost converters.

FIG. 1 (Prior Art) is a functional block diagram of the TPS63011 average current mode DC-to-DC converter available from Texas Instruments Incorporated of Dallas, Tex. In a buck mode, one of four switches is active, another switch is operating as a rectifier, another switch is permanently on, and the last switch is permanently off. In a boost mode, one switch is active, one switch is operating as a rectifier, one switch is permanently on, and one switch is permanently off. There is no mode of operation in which all four switches are switching. The converter automatically switches from step down operation to step up operation and back as required. Controlling the four switches in this way allows the converter to maintain high efficiency including during times when the input voltage VIN is close to the output voltage VOUT.

FIG. 2 (Prior Art) is a functional block diagram of the LTC3440 buck-boost DC/DC converter available from Linear Technology Corporation of Milpitas, Calif. If VIN is approximately VOUT, then the converter operates in a four-switch buck/boost region of operation. In this mode, the duty cycle of switch SWA is not equal to the duty cycle of switch SWC. There is an amount of time during which SWB and SWC are both off, and SWA and SWD are both on. As disclosed in U.S. Pat. No. 6,166,527, voltage mode control is used to adjust the duty cycle of the switches to maintain VOUT at the desired regulated voltage. If the input voltage VIN is larger than the output voltage VOUT, then SWD is always on and SWC is always off such that the converter operates as a buck converter. If VIN is less than VOUT, then SWA is always on and SWB is always off such that the converter operates as a boost converter.

Although the circuits of FIGS. 1 and 2 operate satisfactorily in many applications, improvements are desired.

SUMMARY

A flexible and adaptable average current mode controlled DC-to-DC converter is programmable to operate in a buck mode, a boost mode, and a four-switch mode. The mode in which the converter operates is determined by the difference between the converter output voltage VOUT and the converter input voltage VIN. In one operational example, if VOUT-VIN is a relatively large negative value then the converter operates in a pure buck mode, whereas if VOUT-VIN is approximately zero then the converter operates in a four-switch mode, whereas if VOUT-VIN is a relatively large positive value then the converter operates in a pure boost mode. Whether the four-switch mode is a full-time four-switch mode or a partial four-switch mode can be quickly and easily programmed by the user by setting digital programming bits. In one example, the digital programming bits are serially loaded and stored into the converter and are utilized in a ramp generator portion of the converter.

The novel converter can also be user programmed to operate in a selectable one of other ways. For example, the converter can be user programmed so that there is no intervening four-switch mode between the buck mode and the boost mode, but rather the converter operates either in buck or boost mode depending on VOUT-VIN. The converter can also be user programmed so that the converter always operates in a conventional full-time four-switch mode regardless of the magnitude of VOUT-VIN such that the converter has no conventional buck or boost modes.

In one embodiment, the converter is user programmed by setting a DC voltage offset between two internally generated ramp signals and by setting an associated error voltage limiting circuit and an associated inverting circuit. The DC voltage offset is actually changed within the converter as a selectable function of VOUT-VIN. A ramp generator sets the DC voltage offset depending on the current magnitude of VOUT-VIN according to the selected function. The ramp generator also sets the associated error voltage limiting circuit and the associated inverting circuit so that the overall converter operates properly in the mode selected by the user.

In one example, the novel converter is realized as a standard tile. The tile is of an architecture that facilitates the rapid integration of the tile into a larger Chip Scale Package (CSP) integrated circuit involving other tiles. The offset voltage to VOUT-VIN function is set by loading programming data into the CSP integrated circuit via a master tile, and then transferring the programming data from the master tile and into the buck/four-switch/boost tile. The programming data may be stored in the buck/four-switch/boost tile in non-volatile memory.

Other structures and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
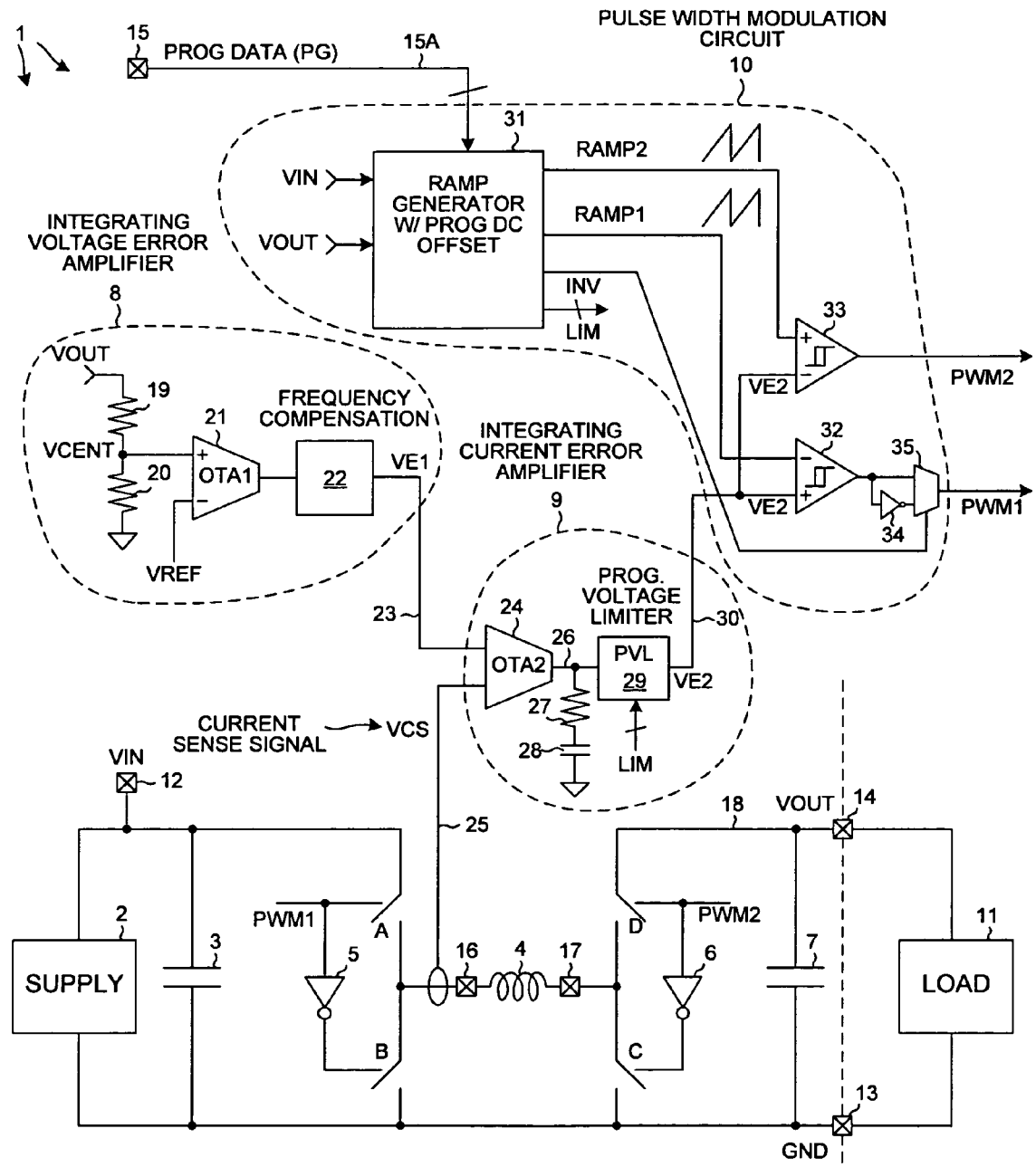
FIG. 3 is a block diagram of an average current mode converter having a partial four-switch mode in accordance with one novel aspect.

FIG. 3 is a diagram of a switch mode DC-to-DC converter 1 in accordance with one novel aspect. DC-to-DC converter 1 includes a supply 2 of a DC input voltage VIN, a smoothing capacitor 3, four switches A, B, C and D, an inductor 4, a pair of inverters 5 and 6, a storage capacitor 7, an integrating voltage error amplifier 8, an integrating current error amplifier 9, a pulse width modulation circuit 10, and a load 11. Part of the converter 1 is implemented in integrated circuit form. The integrated circuit includes terminals 12-17. Terminal symbol 15 represents multiple terminals across which a multi-bit digital value can be received in parallel. Alternatively, the multi-bit digital value can be received serially across one terminal and an associated conductor 15A and is then converted from serial to parallel form in ramp generator 31.

Integrating voltage error amplifier 8 receives the output voltage VOUT on output node 18, voltage divides VOUT using a voltage divider involving resistors 19 and 20 thereby generating a centertap voltage VCENT proportional to VOUT. A first operational transconductance amplifier (OTA1) 21 compares VCENT to a reference voltage VREF and outputs a current signal whose magnitude is indicative of the voltage difference between VCENT and VREF. The current signal output by OTA1 21 is frequency compensated by block 22. Block 22 may, for example, be an analog low pass filter involving a capacitor and a resistor. The resulting voltage signal VE1 is a first error signal that is output onto node 23. VE1 is indicative of an error between VOUT and a desired value of VOUT.

A second operational transconductance amplifier (OTA2) 24 of integrating current error amplifier 9 compares a current sense signal VCS on node 25 to the first error voltage VE1 on node 23. Voltage VCS is indicative of the magnitude of current IL flowing in inductor 4. VCS may, for example, be generated using an inductor DCR current sense circuit involving a RC or an RCR circuit coupled across the terminals 16 and 17 of inductor 4.

The resulting current error signal on node 26 is filtered by an RC circuit involving-resistor 27 and capacitor 28. The filtered signal passes through a programmable voltage limiter (PVL) 29 and is output onto node 30 as a second error voltage signal VE2. The overall integrating current error amplifier circuit 9 therefore integrates, over several switching cycles, the difference between the required current (as determined by VE1) and the current sensed (as determined by VCS). VE2 sets the average current flowing through inductor 4 in each switching cycle.

The voltage to which PVL 29 limits VE2 is set by ramp generator 31. For example, in a first setting PVL 29 allows VE2 to range from zero volts to a maximum of 1.0 volts, whereas in a second setting PVL 29 allows VE2 to range from zero volts to a maximum of 1.5 volts. Ramp generator 31 controls PVL 29 in accordance with the selected offset voltage to VOUT-VIN function, as described in further detail below.

Pulse width modulation circuit 10 includes ramp generator 31. Ramp generator 31 receives a multi-bit digital programming data value (PG) via terminals 15 and conductors 15A. Ramp generator 31 also receives the input voltage VIN and the output voltage VOUT. Ramp generator 31 uses the programming data value, the input voltage VIN and the output voltage VOUT to generate a first ramp voltage signal RAMP1 and a second ramp voltage signal RAMP2 such that a programmable DC voltage offset voltage exists between the two ramp signals. A first comparator with hysteresis 32 compares the second error voltage VE2 with the first ramp signal RAMP1. The signal output by first comparator 32 is selectably inverted by inverter 34 and multiplexer 35. Whether the signal is inverted or is not inverted is determined by ramp generator 31. The resulting signal as output by multiplexer 35 is a first pulse width modulation signal PWM1. PWM1 controls the switching of switches A and B as illustrated. If PWM1 is high, then switch A is ON and switch B is OFF. Otherwise, if PWM1 is low, then switch A is OFF and switch B is ON. A second comparator with hysteresis 33 compares the second error voltage VE2 with the second ramp signal RAMP2 to output a second pulse width modulation signal PWM2. PWM2 controls the switching of switches D and C as illustrated. If PWM2 is high, then switch D is ON and switch C is OFF. Otherwise, if PWM2 is low, then switch D is OFF and switch C is ON. In one novel aspect, ramp generator 31 changes the offset voltage between the two ramp signals RAMP1 and RAMP2 as a programmable function of VIN and VOUT. FIGS. 4, 8, 10, 11 and 12 illustrate five different possible offset voltage to (VOUT-VIN) functions. The particular function selected at a given time depends upon the current multi-bit programming data value loaded into ramp generator 31.

Figure 4:
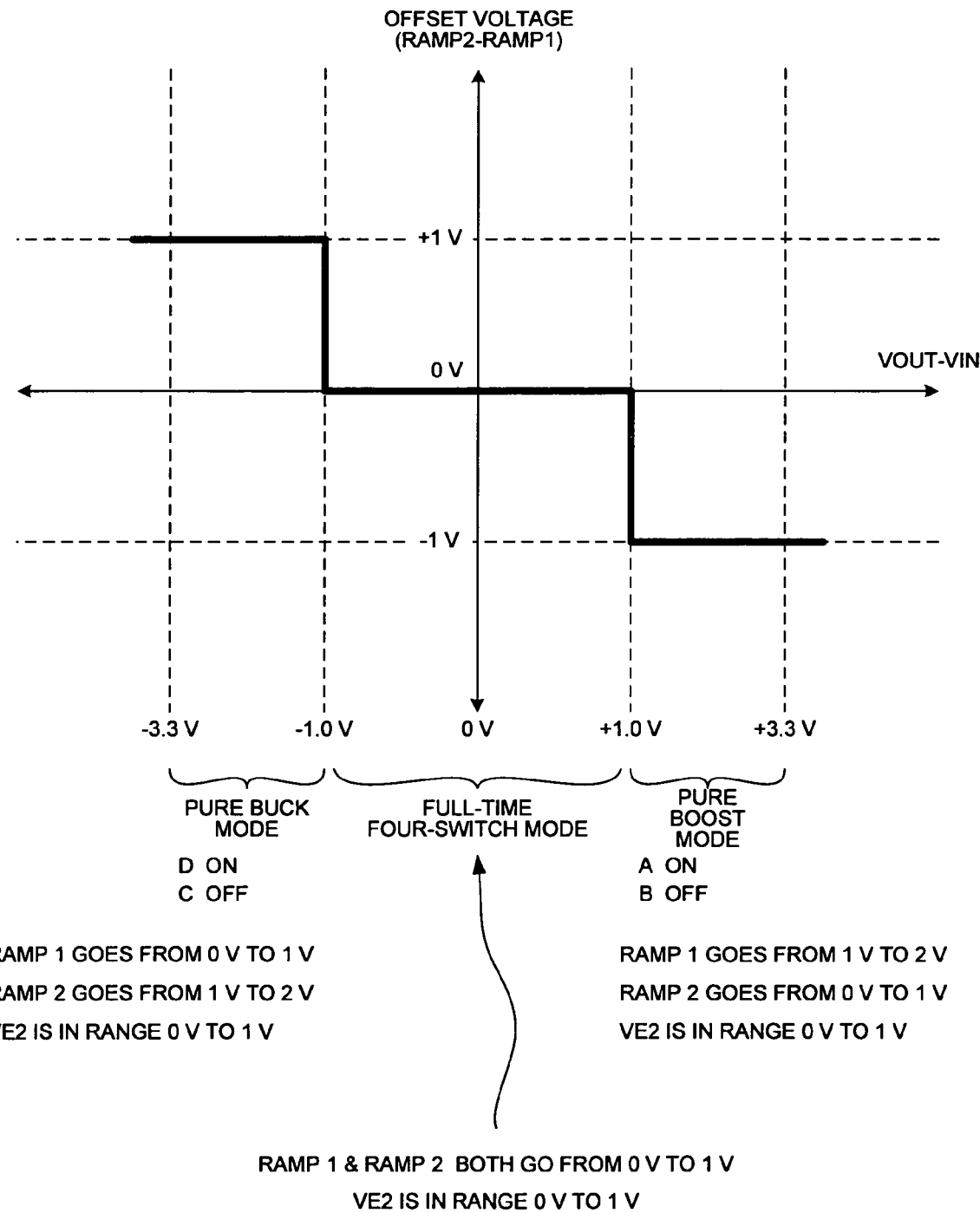
FIG. 4 is a diagram that shows a first of several offset voltage to VOUT-VIN functions that can be employed by the converter of FIG. 3. Although not illustrated in FIG. 4, each VOUT-VIN region of the relationship illustrated in FIG. 4 defines and includes associated control values for controlling PVL 29 and inverting circuit 34, 35.

FIGS. 4, 5A, 5B and 5C illustrate one possible operation of switch mode DC-to-DC converter 1. As illustrated in FIG. 4, if VOUT-VIN is in the range of from −3.3 volts to −1.0 volts, then the offset voltage is +1.0 volts and the circuit operates in the "pure buck mode". Switch D is permanently OFF and switch C is permanently ON.

Figure 5A:
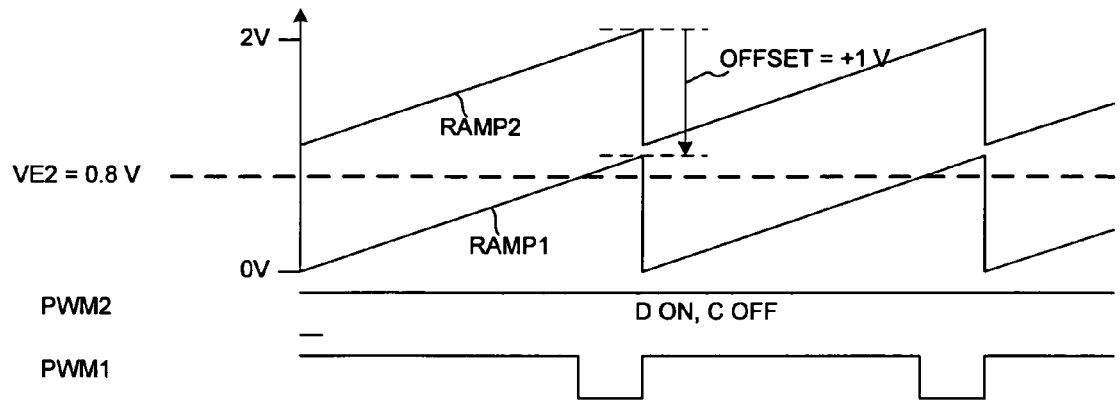
FIGS. 5A-5C are waveform diagrams that show operation of the converter of FIG. 3 when the function of FIG. 4 is employed and when the converter is operating in the pure buck mode.

FIG. 5A illustrates operation when VE2 is a relatively high +0.8 volts. Throughout the time period illustrated in FIG. 5A, signal RAMP2 although it is ramping up and then returning back down, is always higher than VE2. Comparator 33 therefore always outputs PWM2 to have a constant high value. This is indicated by the PWM2 waveform in FIG. 5A. Switch D is therefore always ON and switch C is always OFF. The RAMP1 signal, however, crosses VE2 as indicated in FIG. 5A. When RAMP1 is higher than VE2, then comparator 32 outputs a low signal due to the way the inputs of comparator 32 are connected. When RAMP1 is lower than VE2, then comparator 32 outputs a high signal. The circuit including inverter 34 and multiplexer 35 is controlled by ramp generator 31 so that is it not inverting. PWM1 is therefore high for a large proportion of the time, indicating that more energy from the input is to be stored in inductor 4 in each switching cycle.

Figure 5B:
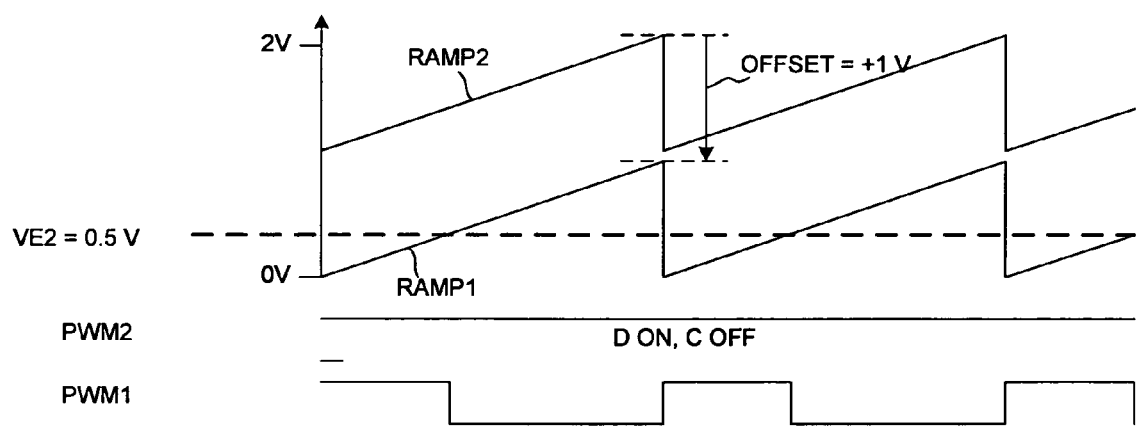

FIG. 5B illustrates operation when VE2 is a lower +0.5 volts. Note that PWM1 is high for a smaller proportion of the time than in the case of FIG. 5A.

Figure 5C:
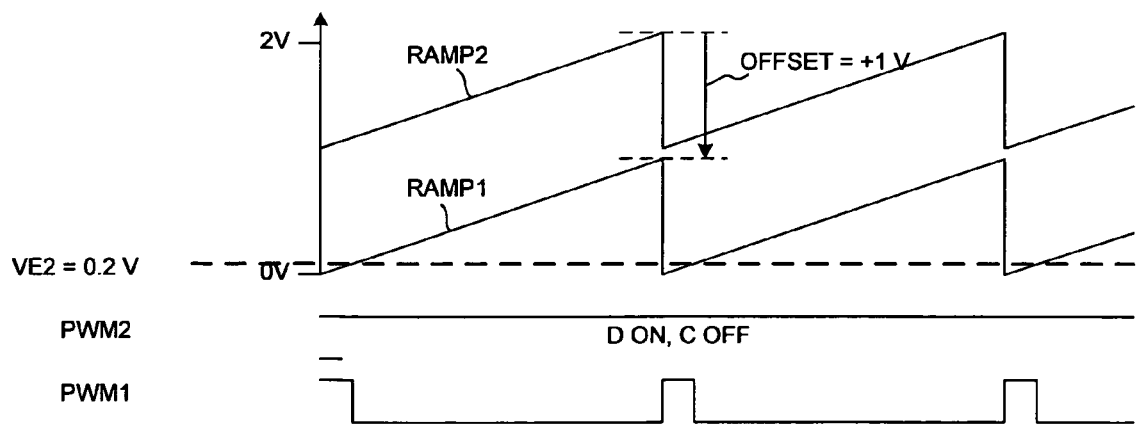

FIG. 5C illustrates operation when VE2 is a still lower +0.2 volts. Note that PWM1 is low the majority of the time. By changing the duty cycle of PWM1 in this way, switches A and B are made to switch such that the amount of energy stored in inductor 4 per switching cycle is such that VOUT is regulated to the desired value as determined by VREF. The converter 1 of FIG. 3 operates as a pure buck converter.

If, however, VOUT-VIN exceeds −1.0 volts, then as indicated in FIG. 4 ramp generator 31 changes the offset voltage between RAMP1 and RAMP2 to be zero volts. This causes the circuit of FIG. 3 to operate in a "full-time four-switch mode". In this mode, each of the four switches A, B, C and D switches each switching cycle, and there is no significant amount of time when both switches A and D are ON at the same time.

Figure 6A:
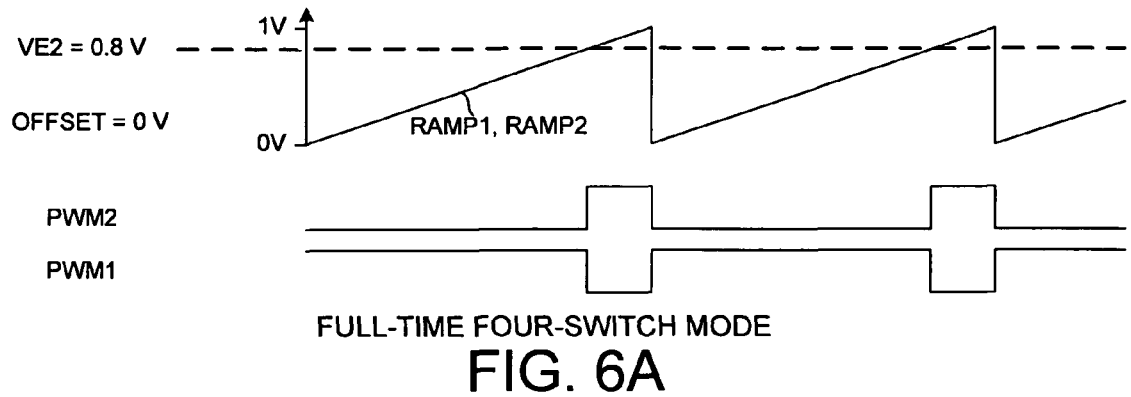
FIGS. 6A-6C are waveform diagrams that show operation of the converter of FIG. 3 when the function of FIG. 4 is employed and when the converter is operating in the full-time four-switch mode.
Figure 6B:
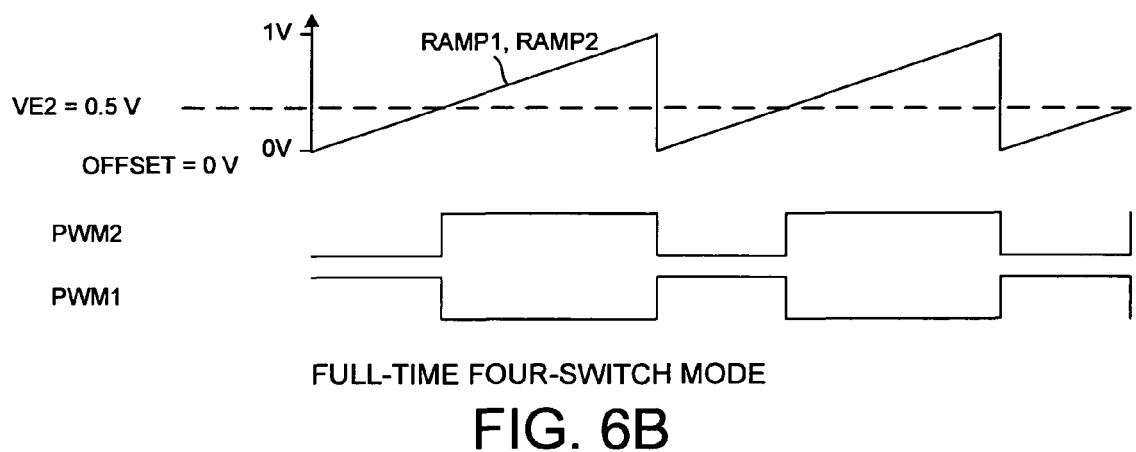
Figure 6C:
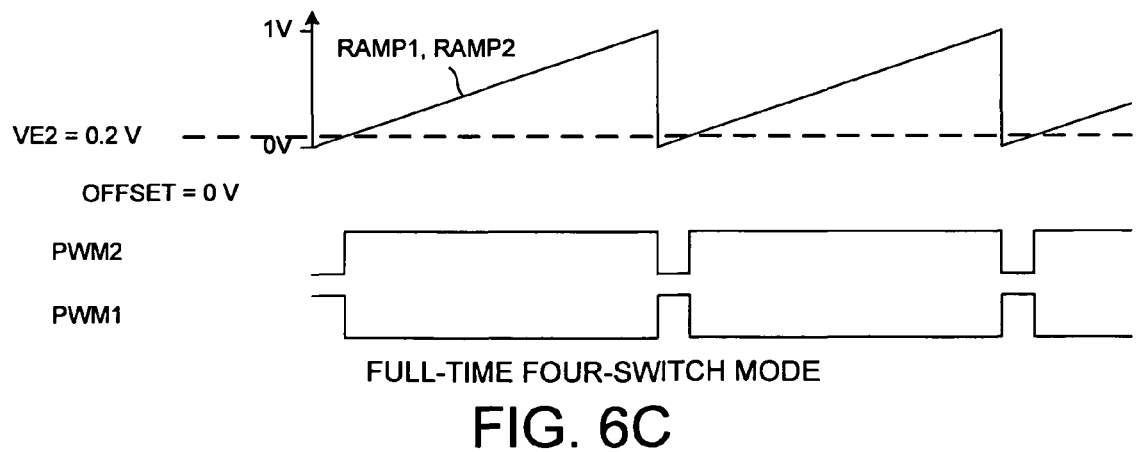

As indicated in FIG. 6A, RAMP1 and RAMP2 have the same voltage waveform because the offset voltage between them is zero. If RAMP1 is greater than VE2, then comparator 32 outputs a low signal, otherwise comparator 32 outputs a high signal. The circuit involving inverter 34 and multiplexer 35 is controlled by ramp generator 31 to be non-inverting. PWM1 is therefore high other than the small amount of time that RAMP1 is greater than VE2. PWM2 is the inverse of PWM1 due to how the input signals are connected to the input leads of comparator 33. FIG. 6B illustrates full-time four-switch mode operation when VE2 is a lower +0.5 volts. Note that PWM1 is high a smaller proportion of the time as compared to the amount of time PWM1 was high in FIG. 6A. FIG. 6C illustrates full-time four-switch mode operation when VE2 is a still lower +0.2 volts. Note that PWM1 is high a still smaller proportion of the time. Accordingly, it is seen from FIGS. 6A-6C that the circuit of FIG. 3 regulates VOUT by switching switches A, B, C and D such that at all times two of the four switches are ON and such that for no significant amount of time are switches A and D both ON.

If, however, VOUT-VIN exceeds +1.0 volts, then as indicated in FIG. 4 ramp generator 31 changes the offset voltage between RAMP1 and RAMP2 to be −1.0 volts. This causes the circuit of FIG. 3 to operate in "pure boost mode". In this mode, switch A is permanently ON, switch B is permanently OFF, and switches C and D are made to switch such that VOUT is regulated to a desired VOUT.

Figure 7A:
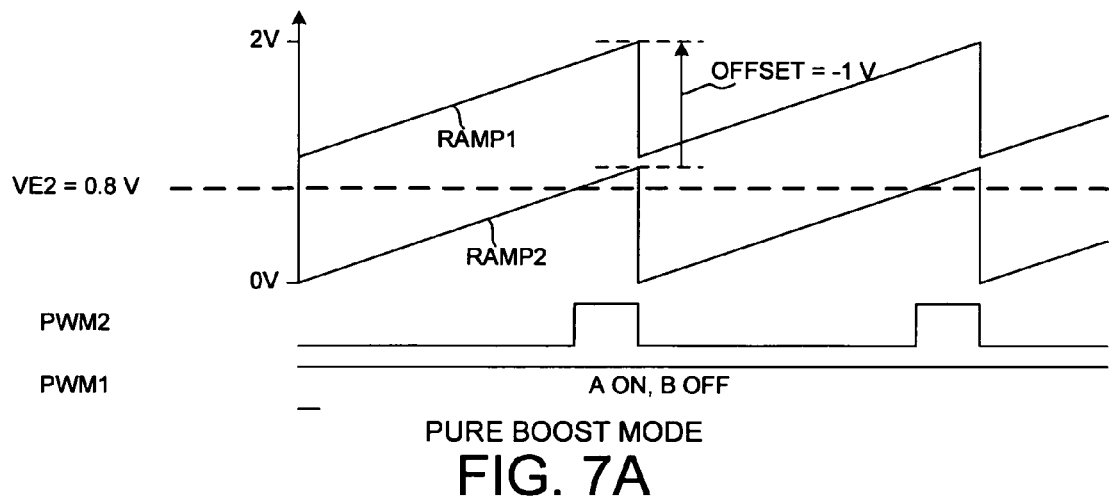
FIGS. 7A-7C are waveform diagrams that show operation of the converter of FIG. 3 when the function of FIG. 4 is employed and when the converter is operating in the pure boost mode.

FIG. 7A shows RAMP2 being offset below RAMP1 by one volt (−1.0 volt offset), as compared to the waveform of FIG. 5A that shows RAMP2 being offset above RAMP1 by one volt (+1.0 volt offset). The circuit involving inverter 34 and multiplexer 35 is controlled by ramp generator 31 to invert. Accordingly, in the waveforms of FIG. 7A the signal PWM1 is permanently high because RAMP1 is always higher than VE2. Switch A is permanently ON and switch B is permanently OFF. Signal PWM2 is high when RAMP2 is higher than VE2. Accordingly, converter 1 operates as a pure boost mode converter.

Figure 7B:
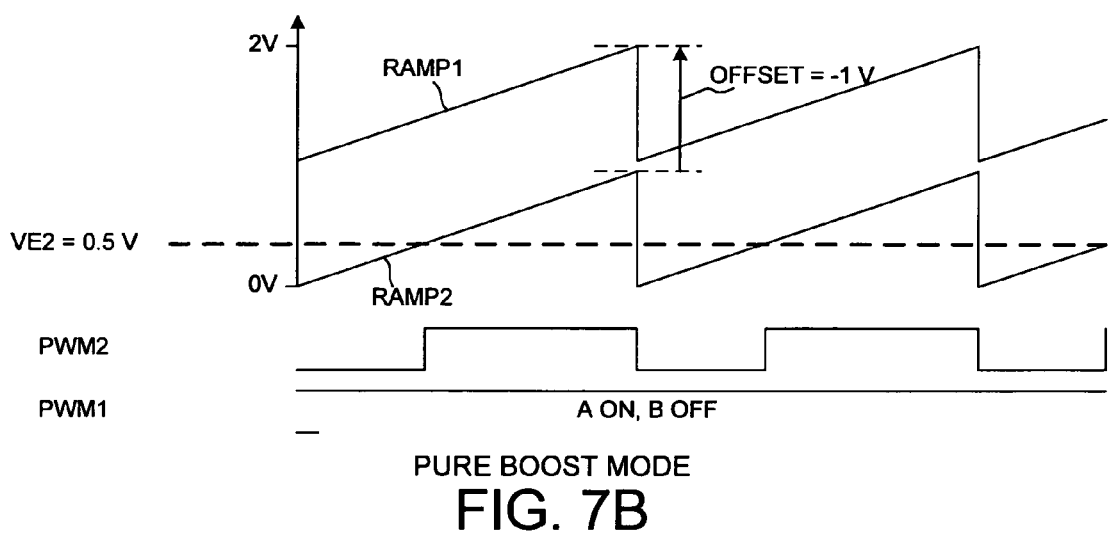

FIG. 7B shows operation in the pure boost mode when VE2 is a lower +0.5 volts. Again, signal PWM1 is permanently high because RAMP1 is always higher than VE2 and the circuit involving inverter 34 and multiplexer 35 is controlled to invert. Switch A is permanently ON and switch B is permanently OFF as in the situation of FIG. 7A, but signal PWM2 is low for a smaller proportion of the time because RAMP2 is higher than VE2 for a larger proportion of the time.

Figure 7C:
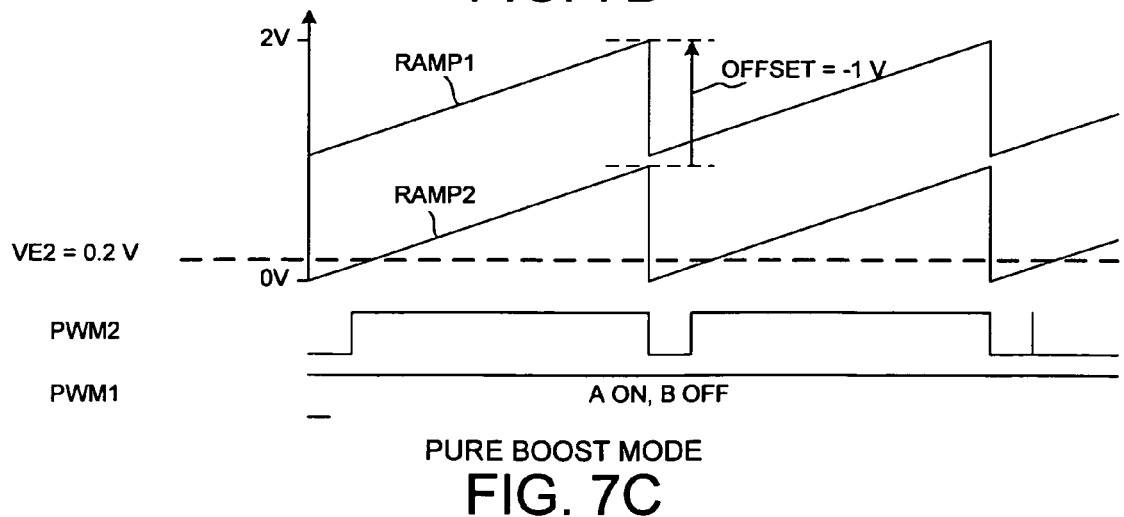

FIG. 7C shows operation in the pure boost mode when VE2 is still lower at +0.2 volts. As illustrated, PWM2 is low for only a small proportion of the time. In this way, the circuit of FIG. 3 controls switches C and D such that VOUT is regulated to the desired VOUT value. The (VOUT-VIN) voltages at which the offset voltage (RAMP2-RAMP1) is made the change from one offset voltage to another in the example of FIG. 4 can also be changed by programming voltage values into appropriate control registers (not shown), which control ramp generator 31. These control registers are written via terminals 15 and conductors 15A.

In one novel aspect, the converter 1 of FIG. 3 is flexible and can be programmed to operate in either a pure buck mode, in a "partial four-switch buck-boost mode", or in a pure boost mode depending on the value of VOUT-VIN. The term "partial four-switch buck-boost mode" as it is used here denotes a mode of operation in which all four switches A, B, C and D switch during each switching cycle, but in which there is an amount of time that switches A and D are simultaneously ON and switches B and C are simultaneously OFF. In the so-called "full-time four-switch buck-boost mode", all four switches A, B, C and D switch during each switching cycle, but there is no substantial amount of time in which switches A and D are simultaneously ON and switches B and C are simultaneously OFF.

Figure 8:
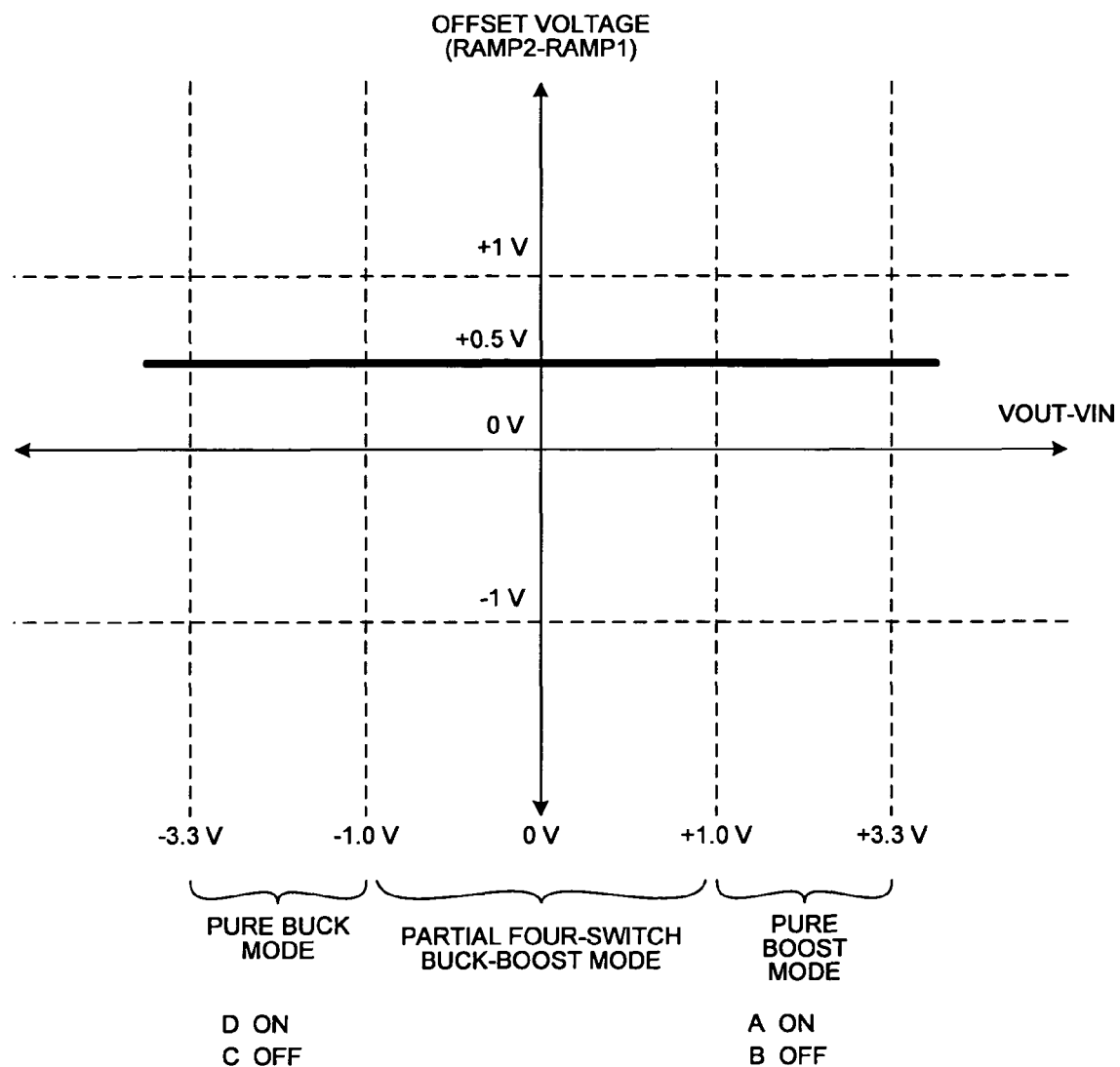
FIG. 8 is a diagram that shows a second of the several offset voltage to VOUT-VIN functions that can be employed by the converter of FIG. 3.
Figure 9A:
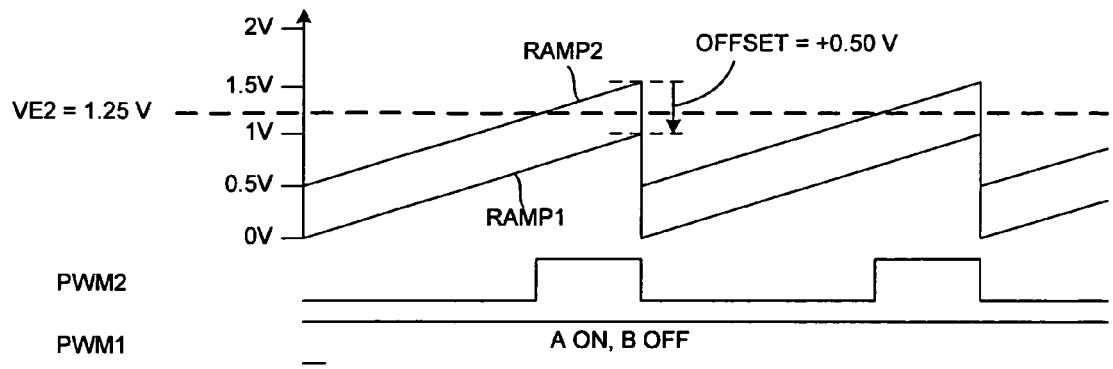
FIG. 9A is a waveform diagram that shows operation of the converter of FIG. 3 when the function of FIG. 8 is employed and when the converter is operating in the pure boost mode.

FIG. 8 illustrates one example of an offset voltage versus VOUT-VIN function that results in partial four-switch buck-boost mode operation. Although not illustrated in FIG. 8, each VOUT-VIN region of the relationship illustrated in FIG. 8 defines and includes associated control values for controlling PVL 29 and inverting circuit 34, 35. The offset voltage is set a constant +0.5 volts over the entire VOUT-VIN range. As indicated in FIG. 9A, if VE2 is high and above +1.0 volts, then the level of RAMP1 is always below VE2. Inverter 34 and multiplexer 35 are controlled to be non-inverting. Accordingly, PWM1 is a constant high value. Switch A is permanently ON and switch B is permanently OFF. The duty cycle of PWM2 is controlled such that VOUT is regulated at the desired voltage.

Figure 9B:
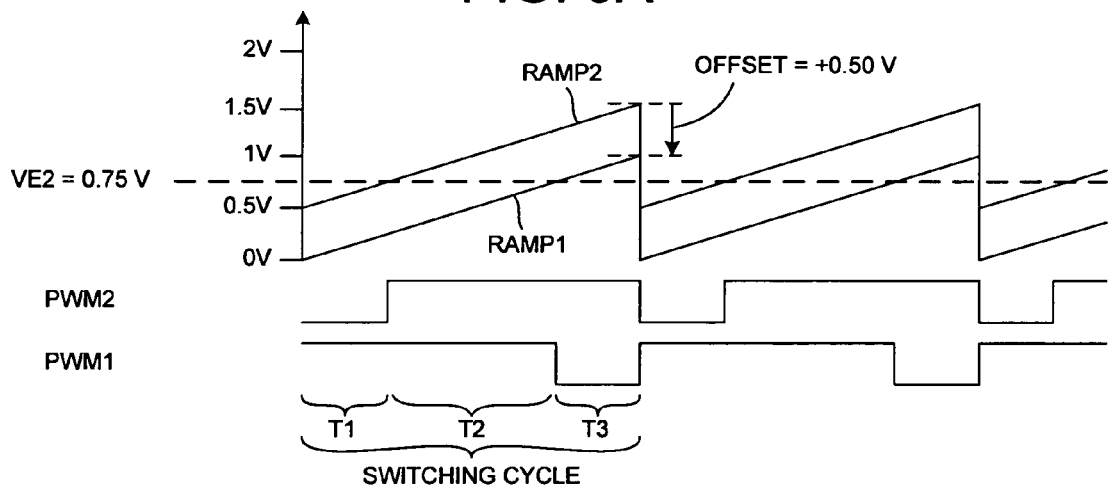
FIG. 9B is a waveform diagram that shows operation of the converter of FIG. 3 when the function of FIG. 8 is employed and when the converter is operating in the partial four-switch buck-boost mode.

As indicated in FIG. 9B, if VE2 is lower between +1.0 volts and +0.5 volts, then RAMP1 crosses the level of VE2. As indicated in FIG. 9B, in a first amount of time T1, PWM1 is high and PWM2 is low. Switch A is ON, switch B is OFF, switch D is OFF, and switch C is ON. During this amount of time T1, energy from the supply 2 is being stored in inductor 4. Then, in a second amount of time T2, both PWM1 and PWM2 are high as illustrated in FIG. 9B. Both switches A and D are therefore ON, and switches B and C are OFF. During this second amount of time T2, the input voltage node at terminal 12 is connected through inductor 4 to output voltage node 18. Then, in a third amount of time T3, PWM2 is high and PWM1 is low. The energy that was stored in inductor 4 during time T1 is now transferred to the output and to load 11. These three amounts of time T1, T2 and T3 are repeated in each switching cycle during the partial four-switch buck-boost mode. As VE2 drops lower and-lower, time T1 decreases in duration and time T3 increases in duration. The durations of T1 and T3 are controlled such that VOUT is regulated to be the desired output voltage.

Figure 9C:
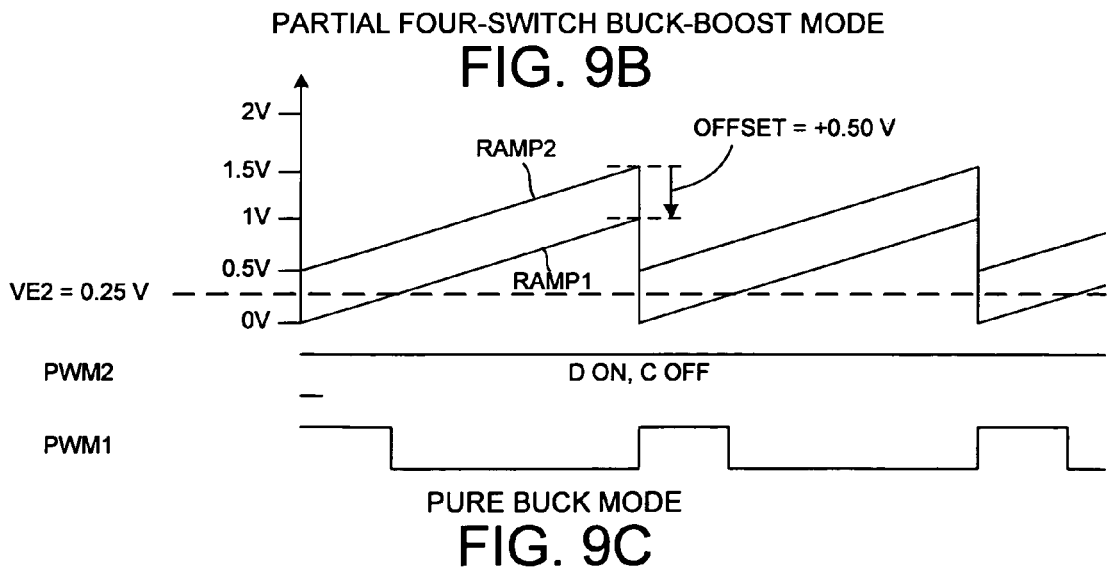
FIG. 9C is a waveform diagram that shows operation of the converter of FIG. 3 when the function of FIG. 8 is employed and when the converter is operating in the pure buck mode.

As indicated in FIG. 9C, if VE2 is still lower below +0.5 volts, then the level of RAMP2 is always higher than VE2. PWM2 is therefore permanently high. Switch D is therefore permanently ON and switch D is permanently OFF. VE2, however, crosses RAMP1. If VE2 decreases, then the proportion of time that PWM1 is high decreases, whereas if VE2 increases then the proportion of time that PWM1 is high increases. The duty cycle of PWM1 is controlled such that VOUT is regulated to the desired output voltage. It is therefore seen that converter 1 of FIG. 3 can be made to operate in a pure buck mode, in a partial four-switch mode, and in a pure boost mode, depending on the magnitude of VOUT-VIN.

Figure 1:
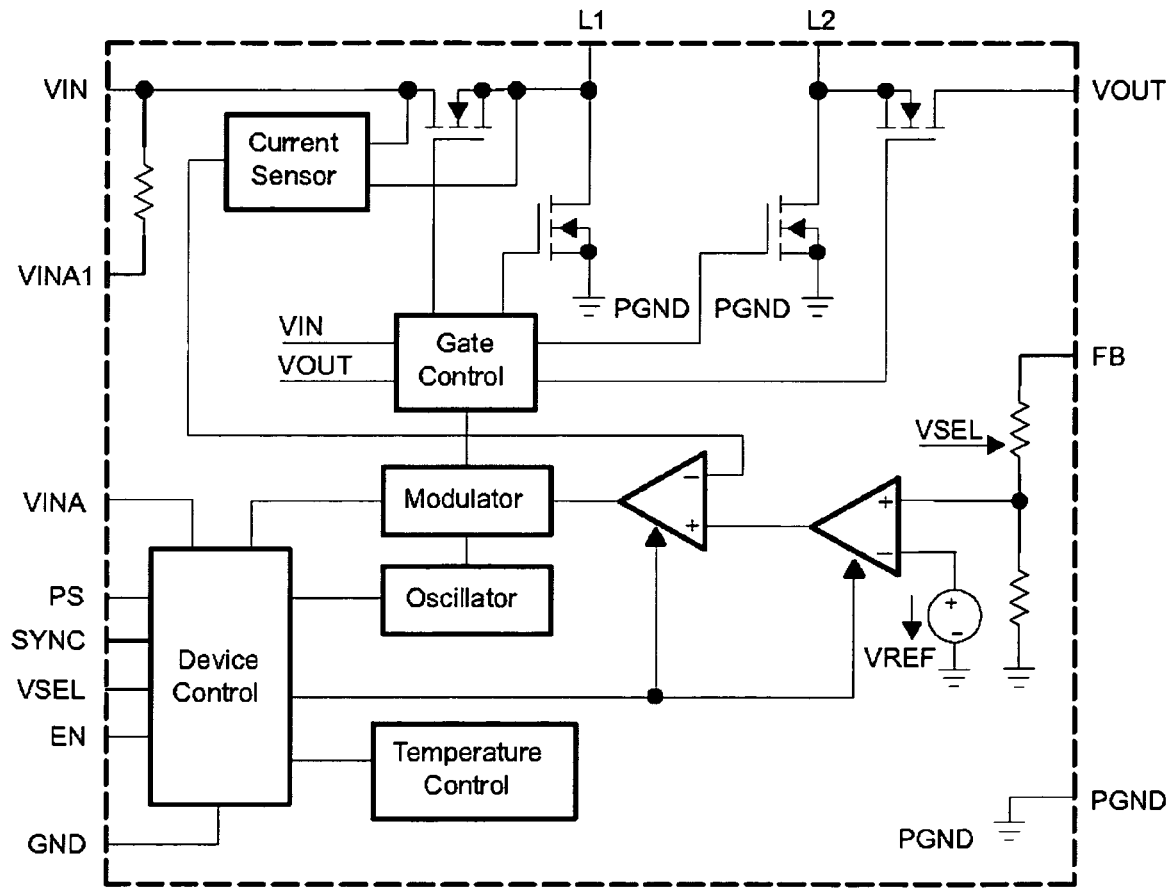
FIG. 1 (prior art) is a diagram of a first conventional converter.
Figure 2:
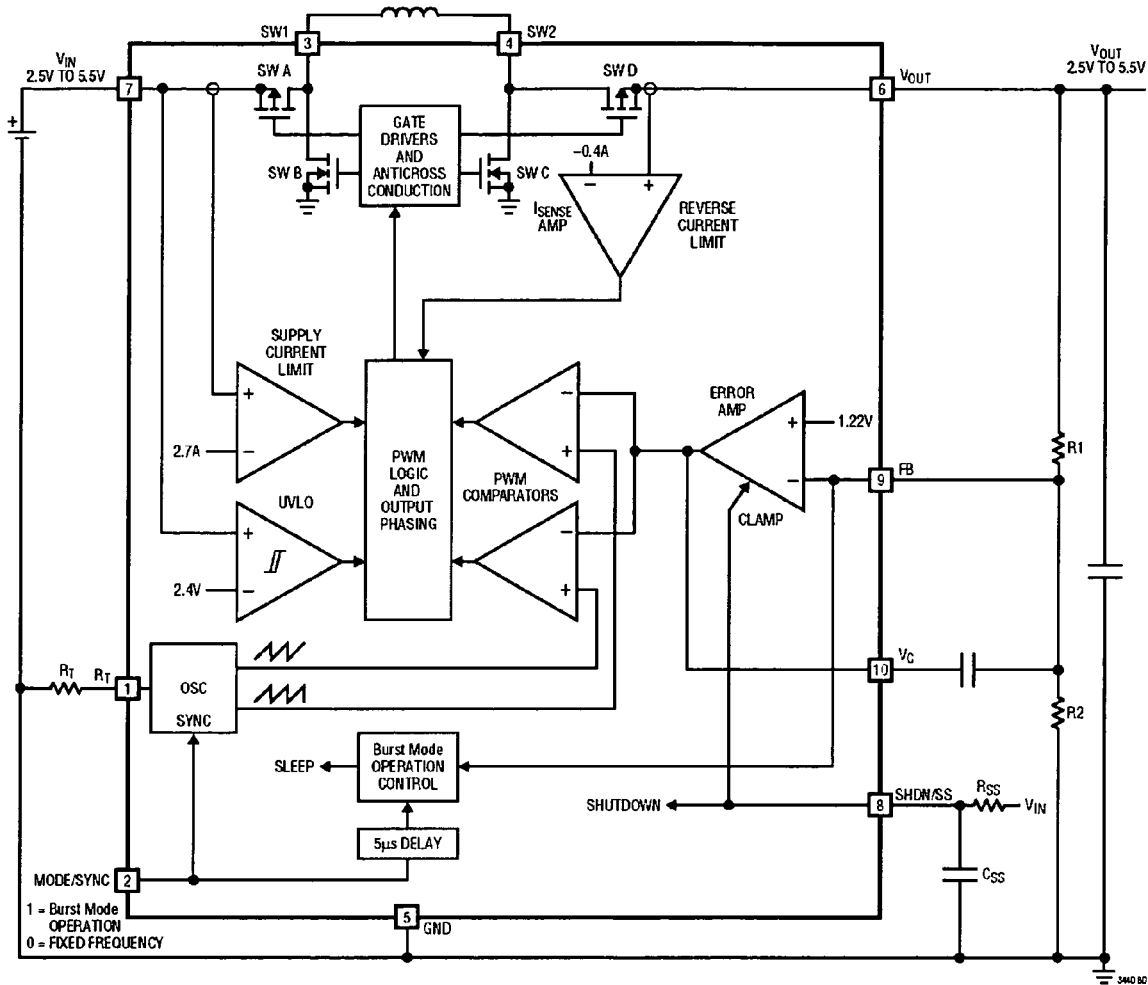
FIG. 2 (prior art) is diagram of a second conventional converter.

In one novel aspect, the four-switch mode can be made to be a selectable one of the full-time four-switch mode and the partial four-switch mode by appropriate programming of ramp generator 31. In both cases, current mode control is used. In the prior art voltage mode control circuit of FIG. 2, a rapid change in the input voltage may cause VOUT to momentarily change. Inductor current during the switching cycle during which the increased input voltage is experienced is increased, thereby causing VOUT to be affected before the voltage control loop reacts, corrects for the increased input voltage, and causes VOUT to return to its desired value. In the novel current mode controlled circuit of FIG. 3, on the other hand, a rapid increase in input voltage is reflected in VCS during that switching-cycle and in response the duty cycle is automatically adjusted. The resulting change in inductor current is much more rapid, and may occur during the same switching cycle as the input variation, resulting in no change in VOUT. Therefore, the current control loop of the novel circuit of FIG. 3 has a faster response time than does the voltage control loop of the conventional circuit of FIG. 2.

Figure 10:
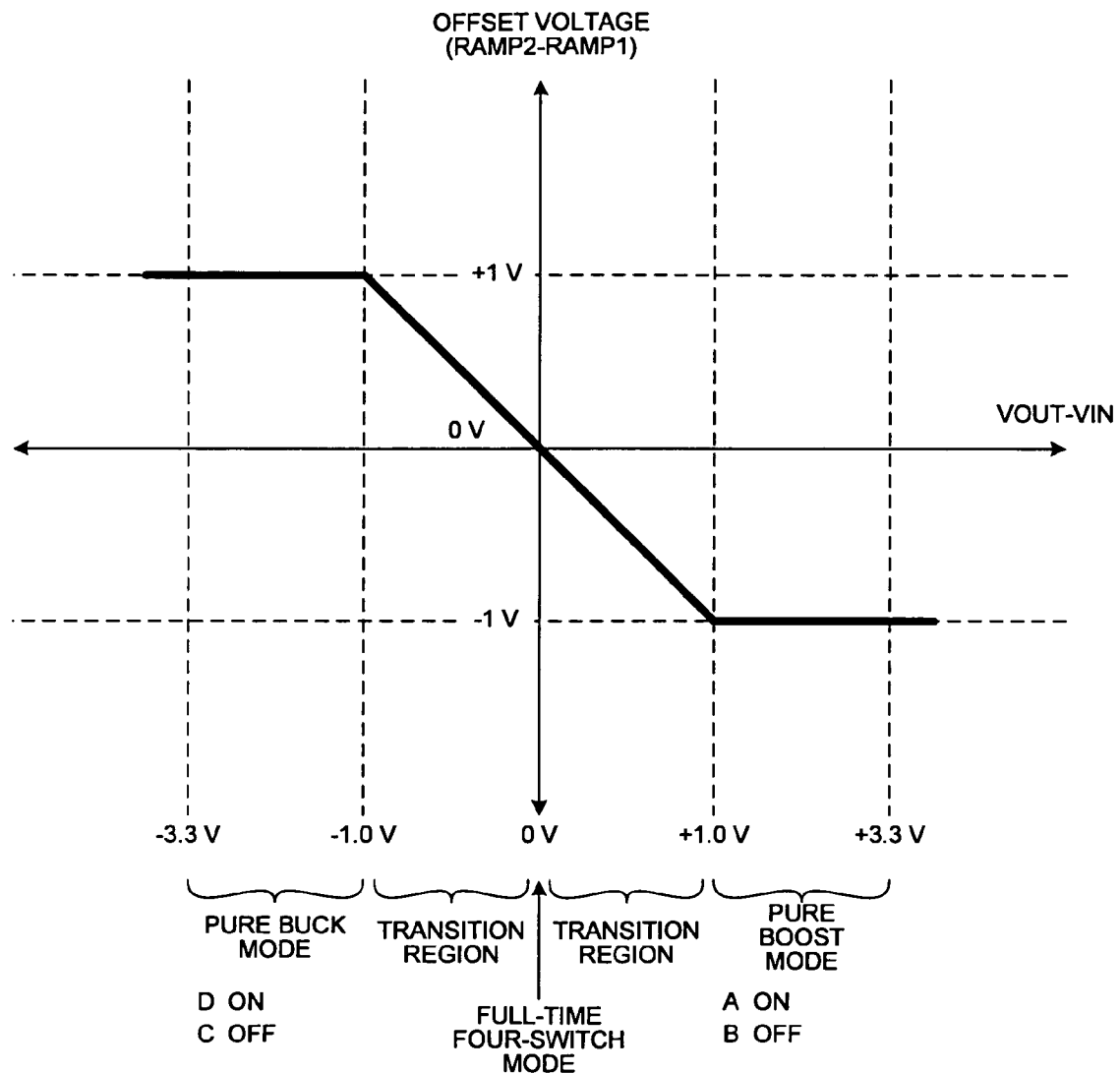
FIG. 10 is a diagram that shows a third of the several offset voltage to VOUT-VIN functions that can be employed by the converter of FIG. 3.

In addition to the offset voltage versus (VOUT-VIN) functions of FIGS. 4 and 8, other functions can be selected by writing appropriate values into ramp generator 31 via terminals 15 and conductors 15A. FIG. 10 illustrates one such function. Depending on the value of VOUT-VIN, the circuit of FIG. 3 operates in either a pure buck mode, a partial four-switch mode, a full-time four-switch mode, another partial four-switch mode, or a pure boost mode. In each of the partial four-switch modes, during each switching cycle, there exists a time duration during which switches A and D are both ON and switches B and C are both OFF. The offset voltage to VOUT-VIN function has a VOUT-VIN region during which the offset voltage function varies linearly (with a non-zero slope) with VOUT-VIN as illustrated in FIG. 10.

Figure 11:
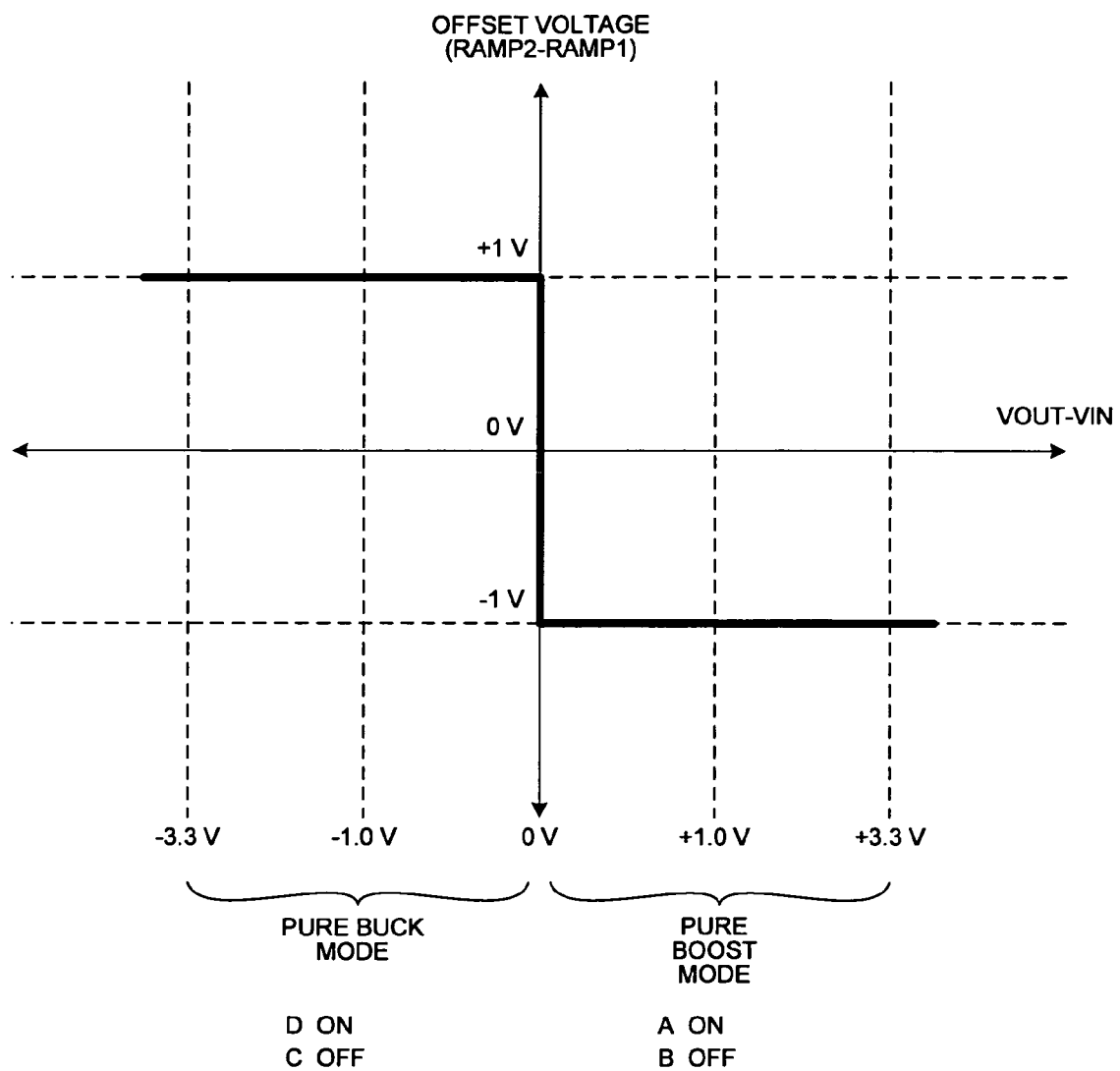
FIG. 11 is a diagram that shows a fourth of the several offset voltage to VOUT-VIN functions that can be employed by the converter of FIG. 3.

FIG. 11 illustrates another offset voltage versus (VOUT-VIN) function. If this function is selected, then the circuit of FIG. 3 operates in either a pure buck mode or pure boost mode. There is no intervening four-switch mode (neither a full-time four-switch mode nor a partial four-switch mode).

Figure 12:
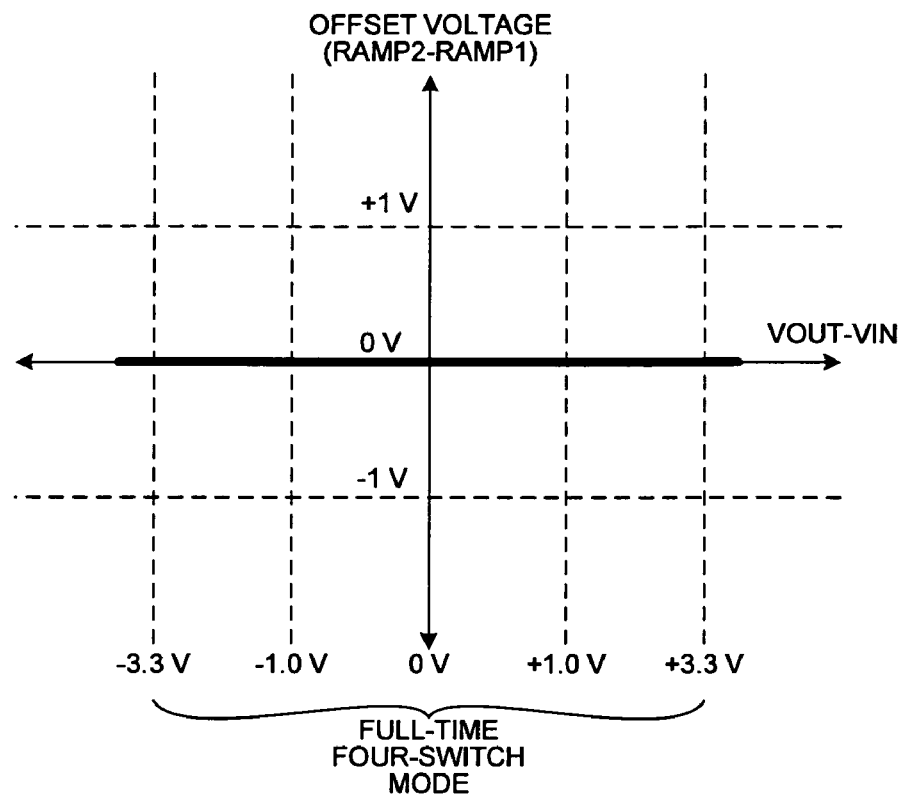
FIG. 12 is a diagram that shows a fifth of the several offset voltage to VOUT-VIN functions that can be employed by the converter of FIG. 3.

FIG. 12 illustrates another offset voltage versus (VOUT-VIN) function. If this function is selected, then the circuit of FIG. 3 always operates in the full-time four-switch mode, regardless of the value of VOUT-VIN. There is no voltage offset between RAMP1 and RAMP2, so the waveforms appear as illustrated in FIG. 6A. In this example, VE2 is limited so that it ranges between zero volts and +1.0 volts.

Figure 13:
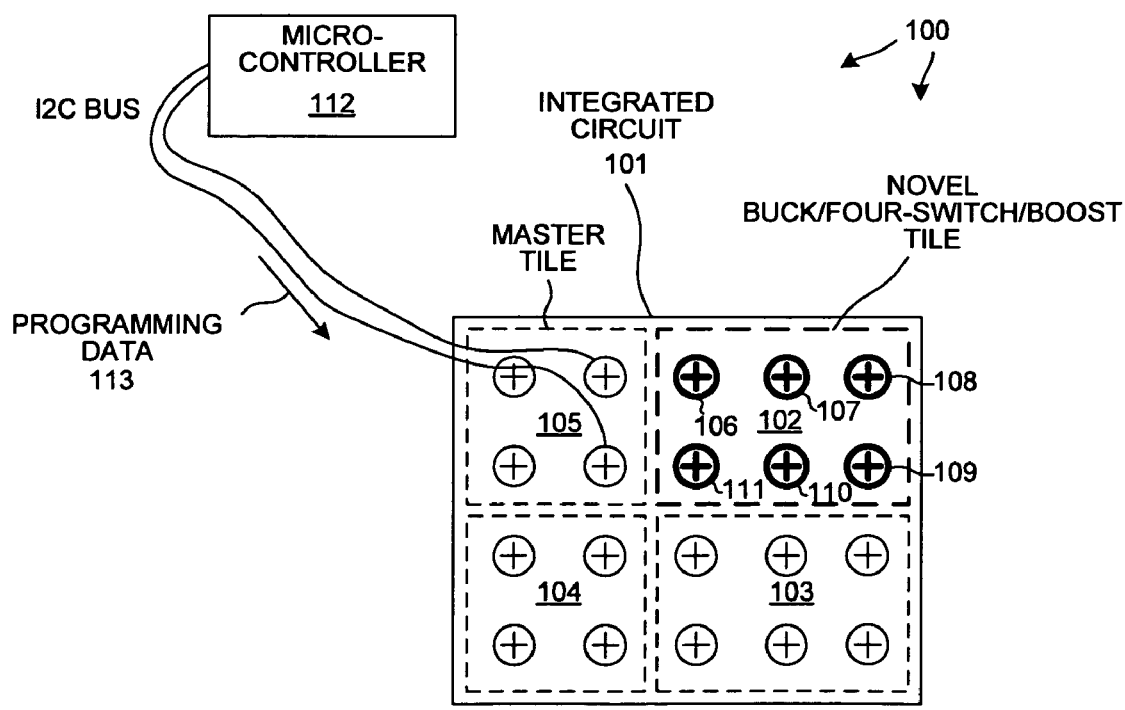
FIG. 13 is a diagram of a-system involving a novel Chip Scale Package (CSP) integrated circuit. The CSP integrated circuit includes a novel buck/four-switch/boost tile as well as other tiles including a master tile.

FIG. 13 is a diagram of a system 100 involving a Chip Scale Package (CSP) integrated circuit 101 in accordance with another novel aspect. The novel converter 1 of FIG. 3 is embodied in the form of a buck/four-switch/boost tile 102. Four tiles 102-105 make up integrated circuit 101. For additional detail on the tile architecture, and how the tiles interconnect and intercommunicate, and how the tiles can be programmably configured, see: 1) U.S. patent application Ser. No. 11/978,458, entitled "Microbump Function Assignment In A Buck Converter", filed Oct. 29, 2007, by Huynh et al., now U.S. Pat. No. 7,788,608; 2) U.S. Pat. No. 11/544,876, entitled "Method and System for the Modular Design and Layout of Integrated Circuits", filed Oct. 7, 2006, by Huynh et al., now U.S. Pat. No. 7,581,198; 3) U.S. provisional application 60/850,359, entitled "Single-Poly EEPROM Structure For Bit-Wise Write/Overwrite", filed Oct. 7, 2006; 4) U.S. patent application Ser. No. 11/888,441, entitled "Memory Structure Capable of Bit-Wise Write or Overwrite", filed Jul. 31, 2007, by Grant et al., now U.S. Pat. No. 7,869,275; and 5) U.S. patent application Ser. No. 11/978,319, entitled "Interconnect Layer of a Modularly Designed Analog Integrated Circuit", filed Oct. 29, 2007, by Huynh et al., now U.S. Pat. No. 7,904,864 (the subject matter of each of these patent documents is incorporated herein in its entirety).

In FIG. 13, novel buck/four-switch/boost tile 102 has six microbumps 106-111, five of which correspond to terminals 12, 13, 14, 16 and 17 of FIG. 3. The programming data that is used to select a function in ramp generator 31 as described above is loaded into tile 102 via master tile 105. In one example, a microcontroller 112 is coupled with a data microbump and a ground microbump of master tile 105 such that programming data 113 is serially communicated from microcontroller 112 and into master tile 105, and from master tile 105 to the ramp generator 31 (see FIG. 3) within tile 102. The loaded programming data may then be stored in tile 102 in non-volatile memory. The novel buck/four-switch/boost tile 102 can be combined with numerous other types of tiles at the integrated circuit design stage to realize a custom application specific CSP integrated circuit.

Although the novel average current mode controlled converter having a buck mode, a boost mode, and a partial four-switch mode is explained above in connection with an embodiment in which the pulse width modulation circuit 10 operates by generating two ramp signals, other circuits for generating the desired PWM1 and PWM2 signals can be employed. In one example, a single ramp signal is generated and a programmable offset voltage is added to the second error voltage VE2 as it is supplied to one of the comparators 32 and 33. Other offset voltage to VOUT-VIN functions can be employed other than, or in addition to, the particular exemplary functions set forth above. The waveform diagrams set forth above are simplifications. For more accurate waveforms, the actual circuit to be realized can be simulated using a circuit simulator (for example, SPICE) that outputs waveform diagrams. Accordingly, various modifications, adaptations, and combinations of various features of the described embodiments can be practiced without departing from the scope of the invention as set forth in the claims.

What is claimed is:

1. A method comprising:
(a) generating a first error signal that is indicative of an error between an output voltage (VOUT) of a DC-to-DC converter and a reference voltage, wherein the DC-to-DC converter has a pure buck mode, a partial four-switch mode, a full-time four-switch mode and a pure boost mode;
(b) generating a current sense signal indicative of a current in an inductor of the DC-to-DC converter;
(c) comparing the current sense signal to the first error signal to generate a second error signal;
(d) using the second error signal to generate a first switch control signal and a second switch control signal, wherein the first switch control signal determines a first switching cycle current flowing through one of the first and second switches, wherein the second switch control signal determines a second switching cycle current flowing through one of the third and fourth switches, wherein if an input voltage (VIN) of the DC-to-DC converter is substantially greater than VOUT then the first, second, third and fourth switches are controlled in (d) such that the DC-to-DC converter operates in the pure buck mode, and wherein if VIN is substantially smaller than VOUT then the first, second, third and fourth switches are controlled in (d) such that the DC-to-DC converter operates in the pure boost mode; and
(e) programming the DC-to-DC converter to operate in the full-time four-switch mode rather than the partial four-switch mode when the input voltage VIN and the output voltage VOUT are approximately equal.

2. The method of claim 1, wherein when the DC-to-DC converter operates in a partial four-switch mode there is an amount of time in which the second and third switches are OFF and the first and fourth switches are ON.

3. An average current mode controlled DC-to-DC converter having a pure buck mode, a partial four-switch mode, and a pure boost mode, wherein the DC-to-DC converter comprises:
an inductor;
a first switch coupled between an input voltage node and a first terminal of the inductor;
a second switch coupled between the first terminal of the inductor and a ground node;
a third switch coupled between a second terminal of the inductor and the ground node;
a fourth switch coupled between an output node and the second terminal of the inductor, wherein during the partial four-switch mode the first switch and the fourth switch are ON during a time that both the second switch and the third switch are OFF;
an integrating voltage error amplifier that compares an output voltage (VOUT) of the DC-to-DC converter to a reference voltage and that outputs a first error signal;
an integrating current error amplifier that compares a current sense signal to the first error signal and that outputs a second error signal, wherein the current sense signal is indicative of a magnitude of a current flowing through the inductor, wherein the second error signal determines an average current of at least one of the first, second, third and fourth switches; and
a pulse width modulation circuit that includes a programmable ramp generator, wherein the pulse width modulation circuit uses an output from the programmable ramp generator and the second error signal to generate switch control signals that determine the current flowing through the first, second, third and fourth switches.

4. A method comprising:
(a) generating a first error signal that is indicative of an error between an output voltage (VOUT) of a DC-to-DC converter and a reference voltage;
(b) generating a current sense signal indicative of a current in an inductor of the DC-to-DC converter;
(c) using the current sense signal and the first error signal to generate a second error signal; and
(d) using the second error signal to generate a first switch control signal and a second switch control signal, wherein the first switch control signal determines a first switching cycle current flowing through one of the first and second switches, wherein the second switch control signal determines a second switching cycle current flowing through one of the third and fourth switches, wherein if an input voltage (VIN) of the DC-to-DC converter is substantially greater than VOUT then the first, second, third and fourth switches are controlled in (d) such that the DC-to-DC converter operates in a pure buck mode, wherein if VIN is approximately equal to VOUT then the first, second, third and fourth switches are controlled in (d) such that the DC-to-DC converter operates in a partial four-switch mode, wherein if VIN is substantially smaller than VOUT then the first, second, third and fourth switches are controlled in (d) such that the DC-to-DC converter operates in a pure boost mode, and wherein (d) involves:
generating a first ramp signal;
generating a second ramp signal; and
changing an offset between the first and second ramp signals as a function of VIN and VOUT.

5. An average current mode controlled DC-to-DC converter having a pure buck mode, a partial four-switch mode, and a pure boost mode, wherein the DC-to-DC converter comprises:
an inductor;
a first switch coupled between an input voltage node and a first terminal of the inductor;
a second switch coupled between the first terminal of the inductor and a ground node;
a third switch coupled between a second terminal of the inductor and the ground node;
a fourth switch coupled between an output node and the second terminal of the inductor, wherein during the partial four-switch mode the first switch and the fourth switch are ON during a time that both the second switch and the third switch are OFF;
an integrating voltage error amplifier that compares an output voltage (VOUT) of the DC-to-DC converter to a reference voltage and that outputs a first error signal;
an integrating current error amplifier that receives a current sense signal and the first error signal and that outputs a second error signal, wherein the current sense signal is indicative of a magnitude of a current flowing through the inductor, wherein the second error signal determines an average current of at least one of the first, second, third and fourth switches; and a pulse width modulation circuit that receives the second error signal and generates a first switch control signal and a second switch control signal, wherein the first switch control signal determines a first switching cycle current flowing through one of the first and second switches, wherein the second switch control signal determines a second switching cycle current flowing through one of the third and fourth switches, and wherein the pulse width modulation circuit comprises a ramp generator circuit that outputs a first ramp signal and a second ramp signal, wherein the second ramp signal is offset from the first ramp signal by an offset voltage, and wherein the ramp generator changes the offset voltage as a function of an input voltage (VIN) of the DC-to-DC converter and the output voltage (VOUT) of the DC-to-DC converter.

6. An average current mode controlled DC-to-DC converter having a pure buck mode, a partial four-switch mode, and a pure boost mode, wherein the DC-to-DC converter comprises:

an inductor;

a first switch coupled between an input voltage node and a first terminal of the inductor;

a second switch coupled between the first terminal of the inductor and a ground node;

a third switch coupled between a second terminal of the inductor and the ground node;

a fourth switch coupled between an output node and the second terminal of the inductor, wherein during the partial four-switch mode the first switch and the fourth switch are ON during a time that both the second switch and the third switch are OFF;

an integrating voltage error amplifier that compares an output voltage (VOUT) of the DC-to-DC converter to a reference voltage and that outputs a first error signal;

an integrating current error amplifier that receives a current sense signal and the first error signal and that outputs a second error signal, wherein the current sense signal is indicative of a magnitude of a current flowing through the inductor, wherein the second error signal determines an average current of at least one of the first, second, third and fourth switches; and a pulse width modulation circuit that receives the second error signal and generates a first switch control signal and a second switch control signal, wherein the first switch control signal determines a first switching cycle current flowing through one of the first and second switches, wherein the second switch control signal determines a second switching cycle current flowing through one of the third and fourth switches, and wherein the pulse width modulation circuit comprises a ramp generator circuit that outputs a first ramp signal and a second ramp signal, wherein the second ramp signal is offset from the first ramp signal by an offset voltage, and wherein the offset voltage has a constant value.

7. The average current mode controlled DC-to-DC converter of claim 6, wherein the pulse width modulation circuit comprises:

a first comparator that compares the first ramp signal to the second error signal; and a second comparator that compares the second ramp signal to the second error signal.

8. An average current mode controlled DC-to-DC converter having a pure buck mode, a partial four-switch mode, a full-time four-switch mode and a pure boost mode, wherein the DC-to-DC converter operates in the pure buck mode if an input voltage (VIN) of the DC-to-DC converter is substantially higher than an output voltage (VOUT) of the DC-to-DC converter, wherein the DC-to-DC converter operates in a selectable one of the partial four-switch mode and the full-time four-switch mode if VIN is approximately equal to VOUT, and wherein the DC-to-DC converter operates in the pure boost mode if VIN is substantially lower than VOUT.

9. An average current mode controlled DC-to-DC converter having a pure buck mode, a partial four-switch mode, a full-time four-switch mode and a pure boost mode, wherein the DC-to-DC converter comprises:

an inductor;

a first switch coupled between an input voltage node and a first terminal of the inductor;

a second switch coupled between the first terminal of the inductor and a ground node;

a third switch coupled between a second terminal of the inductor and the ground node; and a fourth switch coupled between an output node and the second terminal of the inductor, wherein during the partial four-switch mode the first switch and the fourth switch are ON during a time that both the second switch and the third switch are OFF, and wherein all four switches switch substantially simultaneously during the full-time four-switch mode.

10. The average current mode controlled DC-to-DC converter of claim 9, wherein the DC-to-DC converter has a full-time four-switch mode, wherein during the full-time four-switch mode there is substantially no amount of time that both the second and third switches are OFF.

11. The average current mode controlled DC-to-DC converter of claim 9, wherein during the full-time four-switch mode there is no amount of time during which both (a) the first switch and the fourth switch are simultaneously on and (b) the second switch and the third switch are simultaneously off.

12. The average current mode controlled DC-to-DC converter of claim 9, wherein during the full-time four-switch mode both (a) the first switch and the fourth switch are simultaneously on and (b) the second switch and the third switch are simultaneously off for no more than 1% of each switching cycle of the inductor.

13. A DC-to-DC converter comprising:

a first switch coupled between an input voltage node and a first inductor node, wherein an input voltage (VIN) is present on the input voltage node;

a second switch coupled between the first inductor node and a ground node;

a third switch coupled between a second inductor node and the ground node;

a fourth switch coupled between an output node and the second inductor node;

an integrating voltage error amplifier that compares an output voltage (VOUT) of the DC-to-DC converter to a reference voltage and that outputs a first error signal;

an integrating current error amplifier that compares a current sense signal to the first error signal and that outputs a second error signal, wherein the current sense signal is indicative of a magnitude of an inductor current; and a pulse width modulation circuit that includes a programmable ramp generator, wherein the pulse width modulation circuit uses an output from the programmable ramp generator and the second error signal to generate switch control signals that determine when the first, second, third and fourth switches switch, and wherein the DC-to-DC converter is operable in a partial four-switch mode in which the first and fourth switches are ON during a time that the second and third switches are OFF, wherein the DC-to-DC converter is also operable in a pure buck mode and in a pure boost mode.

14. The DC-to-DC converter of claim 13, wherein the DC-to-DC converter is programmable such that the DC-to-DC converter does not operate in any four-switch mode but rather operates in the pure buck mode or the pure boost mode depending on a magnitude of VOUT-VIN.

15. The DC-to-DC converter of claim 13, wherein the DC-to-DC converter is programmable such that the DC-to-DC converter operates in a full-time four-switch mode rather than the partial four-switch mode when the input voltage VIN and the output voltage VOUT are approximately equal, wherein the DC-to-DC converter operates in the pure buck mode if VIN is substantially greater than VOUT, and wherein the DC-to-DC converter operates in the pure boost mode if VIN is substantially smaller than VOUT.

16. A DC-to-DC converter comprising:
a first switch coupled between an input voltage node and a first inductor node, wherein an input voltage (VIN) is present on the input voltage node;
a second switch coupled between the first inductor node and a ground node;
a third switch coupled between a second inductor node and the ground node;
a fourth switch coupled between an output node and the second inductor node;
an integrating voltage error amplifier that compares an output voltage (VOUT) of the DC-to-DC converter to a reference voltage and that outputs a first error signal;
an integrating current error amplifier that receives a current sense signal and the first error signal and that outputs a second error signal, wherein the current sense signal is indicative of a magnitude of an inductor current; and
a pulse width modulation circuit that receives the second error signal and generates a first switch control signal and a second switch control signal, wherein the first switch control signal determines when the first and second switches switch, wherein the second switch control signal determines when the third and fourth switches switch, wherein the DC-to-DC converter is operable in a partial four-switch mode in which the first and fourth switches are ON during a time that the second and third switches are OFF, wherein the DC-to-DC converter is also operable in a pure buck mode and in a pure boost mode, wherein the pulse width modulation circuit includes a ramp generator circuit that outputs a ramp signal, and wherein the pulse width modulation circuit changes the ramp signal as a function of the input voltage VIN and the output voltage VOUT.

17. A method comprising:
(a) generating a first error signal that is indicative of an error between an output voltage (VOUT) of a DC-to-DC converter and a reference voltage;
(b) generating a current sense signal indicative of a current in an inductor of the DC-to-DC converter;
(c) using the current sense signal and the first error signal to generate a second error signal; and (d) using the second error signal to generate a first switch control signal and a second switch control signal, wherein the first switch control signal determines a first switching cycle current flowing through one of the first and second switches, wherein the second switch control signal determines a second switching cycle current flowing through one of the third and fourth switches, wherein if an input voltage (VIN) of the DC-to-DC converter is substantially greater than VOUT then the first, second, third and fourth switches are controlled in (d) such that the DC-to-DC converter operates in a pure buck mode, wherein if VIN is approximately equal to VOUT then the first, second, third and fourth switches are controlled in (d) such that the DC-to-DC converter operates in a partial four-switch mode, wherein if VIN is substantially smaller than VOUT then the first, second, third and fourth switches are controlled in (d) such that the DC-to-DC converter operates in a pure boost mode, and wherein (d) involves:
generating a ramp signal; and
changing the ramp signal as a function of VIN and VOUT.

18. An integrated circuit comprising:
a first switch coupled between an input voltage node and a first inductor node;
a second switch coupled between the first inductor node and a ground node;
a third switch coupled between a second inductor node and the ground node;
a fourth switch coupled between an output voltage node and the second inductor node; and
means for determining a voltage difference between an output voltage VOUT on the output voltage node and an input voltage VIN on the input voltage node by comparing the output voltage VOUT to the input voltage VIN and for controlling the first, second, third and fourth switches such that first, second, third and fourth switches are operable as part of an average current mode controlled DC-to-DC converter having a pure buck mode, a partial four-switch mode, and a pure boost mode, wherein whether the average current mode controlled DC-to-DC converter is operating in the pure buck mode, the partial four-switch mode, or the pure boost mode depends upon the voltage difference between the ouput voltage VOUT and the input voltage VIN.

19. The integrated circuit of claim 18, wherein the means is also for controlling the first, second, third and fourth switches such that first, second, third and fourth switches are operable as part of an average current mode controlled DC-to-DC converter that has no pure buck mode, and no pure boost mode, but rather operates in a four-switch mode regardless of a voltage difference between VOUT and VIN.

20. The integrated circuit of claim 18, wherein the means is also for controlling the first, second, third and fourth switches such that first, second, third and fourth switches are operable as part of an average current mode controlled DC-to-DC converter having a pure buck mode, a full-time four-switch mode, and a pure boost mode, wherein whether the average current mode controlled DC-to-DC converter is operating in the pure buck mode, the full-time four-switch mode, or the pure boost mode depends upon a voltage difference between VOUT and VIN.

* * * * *